(12) United States Patent
Douglas et al.

(10) Patent No.: US 11,392,364 B2
(45) Date of Patent: Jul. 19, 2022

(54) ADAPTIVE HOT RELOAD FOR CLASS CHANGES

(71) Applicant: Red Hat, Inc., Raleigh, NC (US)

(72) Inventors: Stuart Douglas, Orange (AU); Stephane Epardaud, Paris (FR)

(73) Assignee: Red Hat, Inc., Raleigh, NC (US)

( * ) Notice: Subject to any disclaimer, the term of this patent is extended or adjusted under 35 U.S.C. 154(b) by 10 days.

(21) Appl. No.: 17/034,790

(22) Filed: Sep. 28, 2020

(65) Prior Publication Data

US 2022/0100488 A1 Mar. 31, 2022

(51) Int. Cl.
G06F 8/65 (2018.01)
G06F 8/61 (2018.01)
G06F 9/445 (2018.01)
G06F 9/54 (2006.01)
G06F 8/20 (2018.01)

(52) U.S. Cl.
CPC .............. *G06F 8/65* (2013.01); *G06F 8/20* (2013.01); *G06F 8/63* (2013.01); *G06F 9/44521* (2013.01); *G06F 9/54* (2013.01)

(58) Field of Classification Search
CPC ..... G06F 8/65; G06F 8/63; G06F 8/20; G06F 9/44521; G06F 9/54
See application file for complete search history.

(56) References Cited

U.S. PATENT DOCUMENTS

| | | | | |
|---|---|---|---|---|
| 6,072,953 A * | 6/2000 | Cohen | ................ | G06F 9/44521 717/118 |
| 6,915,511 B2 | 7/2005 | Susarla et al. | | |
| 8,612,930 B2 * | 12/2013 | Quinn | ................ | G06F 9/44521 717/106 |
| 8,726,343 B1 * | 5/2014 | Borzycki | .............. | H04L 67/104 726/1 |
| 9,038,046 B2 * | 5/2015 | Robertson | ................ | G06F 8/65 717/166 |
| 9,569,199 B2 | 2/2017 | Wang et al. | | |
| 10,067,757 B2 | 9/2018 | Weber et al. | | |
| 10,754,667 B1 * | 8/2020 | Cu-Unjieng | ........ | G06F 9/44521 |

(Continued)

FOREIGN PATENT DOCUMENTS

WO 2017/087801 A1 5/2017

OTHER PUBLICATIONS

Brinkhoff, "A Framework for Generating Network-Based Moving Objects", Aug. 2001, Kluwer Academic (Year: 2001).*

(Continued)

*Primary Examiner* — Wei Y Zhen
*Assistant Examiner* — Junchun Wu
(74) *Attorney, Agent, or Firm* — K&L Gates LLP

(57) ABSTRACT

Improved systems and methods for hot reloading software applications are provided. In one embodiment, a method is provide that includes detecting an update for a software application. It may be determined whether the update represents a change to a class structure of the software application. If the update does not represent a class change, framework metadata for a class corresponding to the update may be replaced. If the update represents a class change, a runtime executable unit of the software application may be removed and replaced. After replacing the framework metadata and/or the runtime executable unit, the software application may be executed according to the update.

20 Claims, 8 Drawing Sheets

(56) References Cited

U.S. PATENT DOCUMENTS

| | | | | |
|---|---|---|---|---|
| 2003/0200350 A1* | 10/2003 | Kumar | ............... | G06F 9/445 |
| | | | | 719/315 |
| 2004/0015936 A1* | 1/2004 | Susarla | ............... | G06F 9/44521 |
| | | | | 717/165 |
| 2005/0278708 A1* | 12/2005 | Zhao | ............... | G06F 8/20 |
| | | | | 717/136 |
| 2008/0022266 A1* | 1/2008 | Hudson | ............... | G06F 8/72 |
| | | | | 717/140 |
| 2012/0254848 A1* | 10/2012 | Robertson | ............... | G06F 9/44521 |
| | | | | 717/166 |
| 2013/0160130 A1* | 6/2013 | Mendelev | ............... | G06F 21/56 |
| | | | | 726/25 |
| 2015/0033215 A1* | 1/2015 | Elias | ............... | G06F 9/45504 |
| | | | | 718/1 |
| 2015/0100951 A1* | 4/2015 | Raundahl Gregersen | ............... | |
| | | | | G06F 9/44521 |
| | | | | 717/166 |
| 2015/0293764 A1* | 10/2015 | Visvanathan | ............... | G06F 8/36 |
| | | | | 717/102 |
| 2015/0378752 A1* | 12/2015 | Stoodley | ............... | G06F 9/44578 |
| | | | | 717/166 |
| 2016/0232017 A1* | 8/2016 | Raundahl Gregersen | ............... | |
| | | | | G06F 9/45508 |
| 2017/0220335 A1* | 8/2017 | Pink | ............... | G06F 9/44536 |
| 2020/0192662 A1* | 6/2020 | Hu | ............... | G06F 8/76 |
| 2020/0302024 A1* | 9/2020 | Murata | ............... | G06F 8/35 |

OTHER PUBLICATIONS

Stefano et al., "An Infrastructure for Runtime Evolution of Software Systems", 2004, IEEE (Year: 2004).*

Mohan et al., "Example-Based Object Detection in Images by Components", Apr. 2001, IEEE, vol. 23 No. 4 (Year: 2001).*

Fayad et al., "Object-Oriented Application Frameworks", Oct. 1997, Communication of The ACM, vol. 40, No. 10 (Year: 1997).*

Anonymous: "Changelog—Wikipedia", Sep. 22, 2020 (Sep. 22, 2020), pp. 1-3, XP055801863, Retrieved from the Internet:URL:https://en.wikipedia.org/w/index.php?title=Changelog&oldid=9797 42195. Retrieved on May 6, 2021.

Anonymous: "Contexts and Dependency Injection—Wikipedia", , Aug. 31, 2017 (Aug. 31, 2017 ), pp. 1-1, XP055801875, Retrieved from the Internet: URL:https://de.wikipedia.org/w/index.php?title=Contexts_and_Dependency_Injection&oldid=168643579. Retrieved on May 6, 2021.

Getting Started Guide Sun ONE Application Server; Version 7; Sun Microsystems, Inc.; Sep. 2002; pp. 1-146.

Automatic DB migrations for Spring Boot with Liquibase; Operator New; www.operatornew.com/2017/07/automatic-db-migrations-for-spring-boot-with liquibase.html; Jul. 9, 2017; retrieved Jun. 2, 2020; pp. 1-6.

* cited by examiner

ADAPTIVE HOT RELOAD FOR CLASS CHANGES

BACKGROUND

When updating or altering software applications, developers often change one or more aspects of the applications (e.g., source code of the applications, classes of the application, methods of the application, and the like). Such changes to software applications often require all or part of the software applications to be rebuilt. For example, bytecode used to execute the software applications may need to be partially or completely regenerated based on altered source code or other aspects of the software application.

SUMMARY

The present disclosure presents new and innovative systems and methods for adaptive hot reload of software applications. In one embodiment, a method is provided that includes detecting an update to a project file for a software application and determining whether the update represents a change to a class structure of the software application. Responsive to determining that the update does not represent a change to the class structure, the method may include replacing framework metadata for a class corresponding to the project file with new framework metadata generated based on the update to the project file. Responsive to determining that the update represents a change to the class structure, the method may include removing a runtime executable unit of the software application, generating a replacement runtime executable unit of the software application based at least in part on the update to the project file, and redeploying the software application with the replacement runtime executable unit. The method may further include executing the software application in compliance with the update to the project file.

In another embodiment, a system is provided that includes a processor and a memory. The memory may store instructions which, when executed by the processor, cause the processor to detect an update to a project file for a software application and generate a replacement runtime executable unit of the software application by, for each respective class of a plurality of classes of the software application. The instructions may further cause the processor to determine whether the respective class is a dependency injection class. Responsive to determining that the respective class is a dependency injection class, the instructions may cause the processor to regenerate a bytecode for the respective class. Responsive to determining that the respective class is not a dependency injection class, the instructions may cause the processor to reuse framework metadata for the respective class. The instructions may also cause the processor to execute the software application in compliance with the update to the project file.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
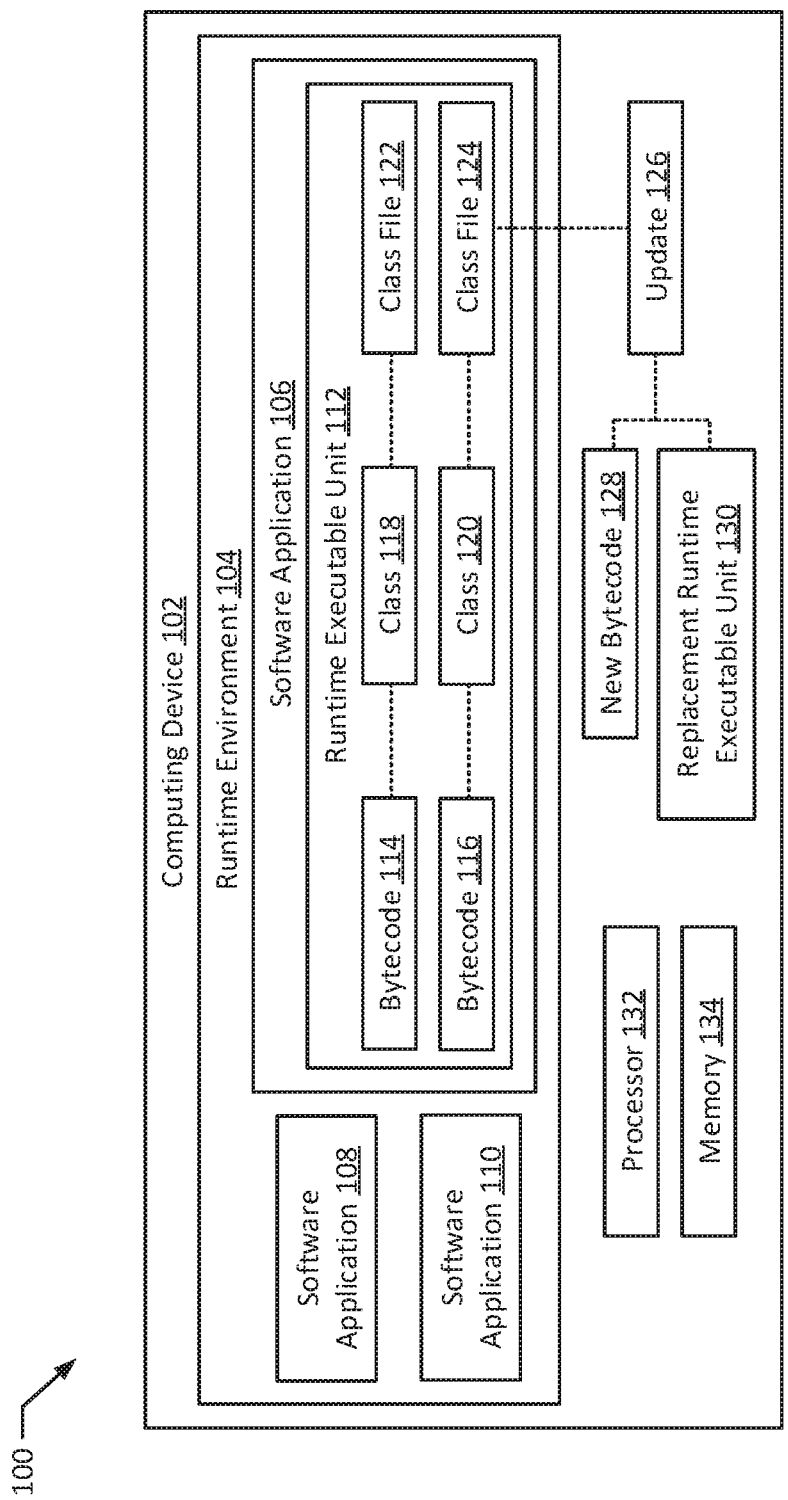
FIG. 1 illustrates a system for adaptive hot reload of software applications according to an exemplary embodiment of the present disclosure.

Certain techniques exist for updating aspects of a software application based on changes received from a developer. For example, the Java® (and related Jakarta) development platforms include mechanisms for reloading portions of a software application without halting the software application's runtime environment, which can be especially important for always-on workloads, such as software applications executing in the cloud, serverless applications, web service applications, and the like. Such mechanisms that update software applications without halting the runtime environment are known as "hot reload" mechanisms.

For example, certain hot reload tools will drop and re-create a class loader for a software application for class changes to the software application and will redeploy the software application within the runtime environment using the re-created class loader. Such tools may ensure that changes to classes for software applications are reflected within the runtime environment, but may result in increased latency as the class loader is rebuilt. In particular, rebuilding and redeploying software applications in this manner may involve latencies of one second or more, which may be unacceptable for certain types of applications. Furthermore, certain applications require larger amounts of initialization tasks, and redeploying such applications may require that these initialization tasks be repeated. Accordingly, using such techniques to redeploy software applications may result in excessive use of computational resources as these initialization tasks are repeated for each redeployment.

Other tools may be used to update application bytecode without redeploying software applications. However, such tools may only be useful in limited circumstances and may be less reliable. For example, the Java instrumentation application programming interface (API) may be used to directly replace the bytecode for particular classes or functions of a software application (e.g., depending on changes to the class of function). However, the instrumentation API may only be usable to update individual classes or functions and may accordingly be of limited use for minor changes to such classes or functions (e.g., due to operating restrictions of the Java® runtime environment). As another example, a Java agent may be used to transform classes or functions of a software application such that the instrumentation API may be used to replace bytecode for the classes or functions.

However, such Java agents typically have reliability issues and create integration complexity, as explicit integration is required by corresponding functions and methods of the software application to ensure that class changes are properly reflected.

Therefore, there exists a need to modify and extend hot reload functionality for software applications such that the software applications are not redeployed within a runtime environment unnecessarily, such as above for systems that are only configured to regenerate and replace class loaders. Furthermore, to the extent that new bytecode is generated based on changes to the software application, there is a need to minimize the amount of bytecode that is regenerated. One solution to this problem is to combine the instrumentation API and the class loader replacement services with additional services to constrain which bytecode is regenerated. In particular, when updates are received, it may be determined whether the updates change a class structure of the software application. If the updates do not change the class structure, a runtime executable unit (e.g., a class loader) of the software application may be updated without having to restart the software application. For example, the runtime executable unit may be updated using an instrumentation API. If the updates do change the class structure, the runtime executable unit may be removed and redeployed for the software application. However, rather than having to rebuild the entire runtime executable unit for classes that are not directly changed by the update, bytecode may only be regenerated for application framework classes within the software application. In this way, the faster update process for the runtime executable unit may be used where possible, limiting latency delays created by replacing the runtime executable unit of the software application. But, even when such replacements are required, the overall latency may still be reduced by minimizing the amount of class bytecode that needs to be regenerated.

FIG. 1 illustrates a system 100 for adaptive hot reload of software applications according to an exemplary embodiment of the present disclosure. The system 100 may be configured to execute software applications in a runtime environment and to update executing software applications without redeploying the runtime environment. For example, the system 100 may be configured to hot reload software applications based on updates to the software applications, while minimizing the frequency with which the software applications are rebuilt and redeployed and also minimizing the amount of replacement bytecode that is generated for the software applications.

The computing device 102 includes a runtime environment 104, an update 126, a processor 132, and a memory 134. The runtime environment 104 may be configured to execute multiple software applications 106, 108, 110. For example, the runtime environment 104 may be a Java runtime environment (e.g., Java Enterprise Edition runtime environment, Jakarta EE runtime environment), and the software applications 106, 108, 110 may be Java Enterprise Edition or Jakarta EE applications. Additional or alternative implementations may use other types of runtime environments built for other programming languages. As shown for the software application 106, the software applications 106, 108, 110 may include runtime executable units 112. The runtime executable units 112 may specify a framework or structure for classes and functions within the software application 106. In particular, the runtime executable units 112 may combine executable code and metadata necessary to execute a software application 106. In certain implementations, the runtime executable units 112 may include Java® class loaders, or other exemplary runtime executable units discussed herein.

The runtime executable unit 112 may include one or more classes 118, 120. The classes 118, 120 may provide prototypes for objects executing within the software application 106 (e.g., the classes 118, 120 may define one or more properties and methods used by instantiated objects). The classes 118, 120 may be defined according to one or more class files 122, 124. For example, the class files 122, 124 may include metadata, source code, class names, and other information necessary to create executable copies of the classes 118, 120. For example, the class files 122, 124 may contain Java source code specifying any of the above information used by the classes 118, 120 and/or specifying operations performed by the classes 118, 120 (e.g., defining methods).

The software application 106 may be deployed as bytecode executable within the runtime environment 104. For example, the classes 118, 120 may be deployed as bytecode 114, 116 that may be executed by the processor 132 of the computing device 102. In particular, bytecode 114, 116 for the classes 118, 120 may be generated based on the class files 122, 124. When the software application 106 is deployed, the classes 118, 120 may be deployed as the bytecode 114, 116. Accordingly, although the runtime executable unit 112 and the software application 106 within the runtime environment 104 are depicted as containing the classes 118, 120 and the class files 122, 124, in practice, the classes 118, 120 and/or the class files 122, 124 may be omitted. Additionally, as discussed further below, the runtime executable unit 112 may, in certain instances, include processes to initialize classes of the software application 106. For example, the runtime executable unit 112 may include a class loader (e.g., a Java class loader) for the software application. The class loader may include bytecode necessary to instantiate classes, may include a hierarchy of the classes or another class structure, and/or may define dependencies between the classes.

Updates may be received for software applications executing within the runtime environment 104. For example, updates may be received from software developers or other users that change one or more aspects of the software applications. For example, updates may change class files 122, 124 corresponding to the classes 118, 120. In one specific example, an update may change one or more instructions for a method within a class 118, 120. In another specific example, an update may change a class structure for the class 118, 120. In a still further example, an update may change the runtime executable unit 112 (e.g., a hierarchy of one or more classes 118, 120 within the runtime executable unit 112, dependencies for one or more classes 118, 120 within the application hierarchy 112).

As depicted, an update 126 is received for the software application 106. In particular, an update 126 is received for the class file 124 of the software application 106. The update may correspond to one or both of new bytecode 128 and a replacement runtime executable unit 130. For example, where the update 126 corresponds to new bytecode 128 but does not include the replacement runtime executable unit 130, the new bytecode 128 may incorporate changes to one or more methods within the class 120, but may not include changes to the overall class structure for the software application 106. For instance, the new bytecode 128 may not incorporate changes to dependencies, hierarchies, or the like for methods within the class 120 and/or for the class 120 within the runtime executable unit 112. In instances where the update 126 is associated with a replacement runtime executable unit 130 (e.g., a replacement class loader), the update 126 may include changes to the class structure for the software application 106. For example, the update 126 may include changes to the class file 124 within a class hierarchy of the runtime executable unit 112 and/or may include differing dependencies for the class 120 and/or methods within the class 120. In such instances, the update 126 may correspond to one or more new bytecode 128, such as new bytecodes for the runtime executable unit 112.

The runtime environment 104 and/or the computing device 102 may be configured to take one or more actions based on the type of update 126. For example, and as explained further below, received updates 126 may be analyzed to determine whether the updates include changes to a class structure of the software application 106. If an update 126 does change the class structure, a replacement runtime executable unit 130 may be generated to replace the runtime executable unit 112. If an update 126 does not change the class structure, a replacement runtime executable unit 130 may not be generated and, instead, new bytecode 128 may be generated to replace bytecode 116 for an updated class 120 without restarting the software application 106. In certain instances, the replacement runtime executable unit 130 may also include new bytecode for one or more updated classes along with previously-generated bytecode 114 for classes 118 that are not updated.

The computing device 102 may be implemented by one or more computing systems. For example, the processor 132 in the memory 134 may be configured to implement one or more operational features of the computing device 102 (e.g., the runtime environment 104). For example, the memory 134 may contain instructions which, when executed by the processor 132, cause the processor 132 to perform one or more of the operational features of the computing device 102. Although not depicted, in practice, the computing device 102 may be implemented as multiple computing devices including multiple processors and/or multiple memories configured to perform one or more of the operations or services discussed herein.

Figure 2:
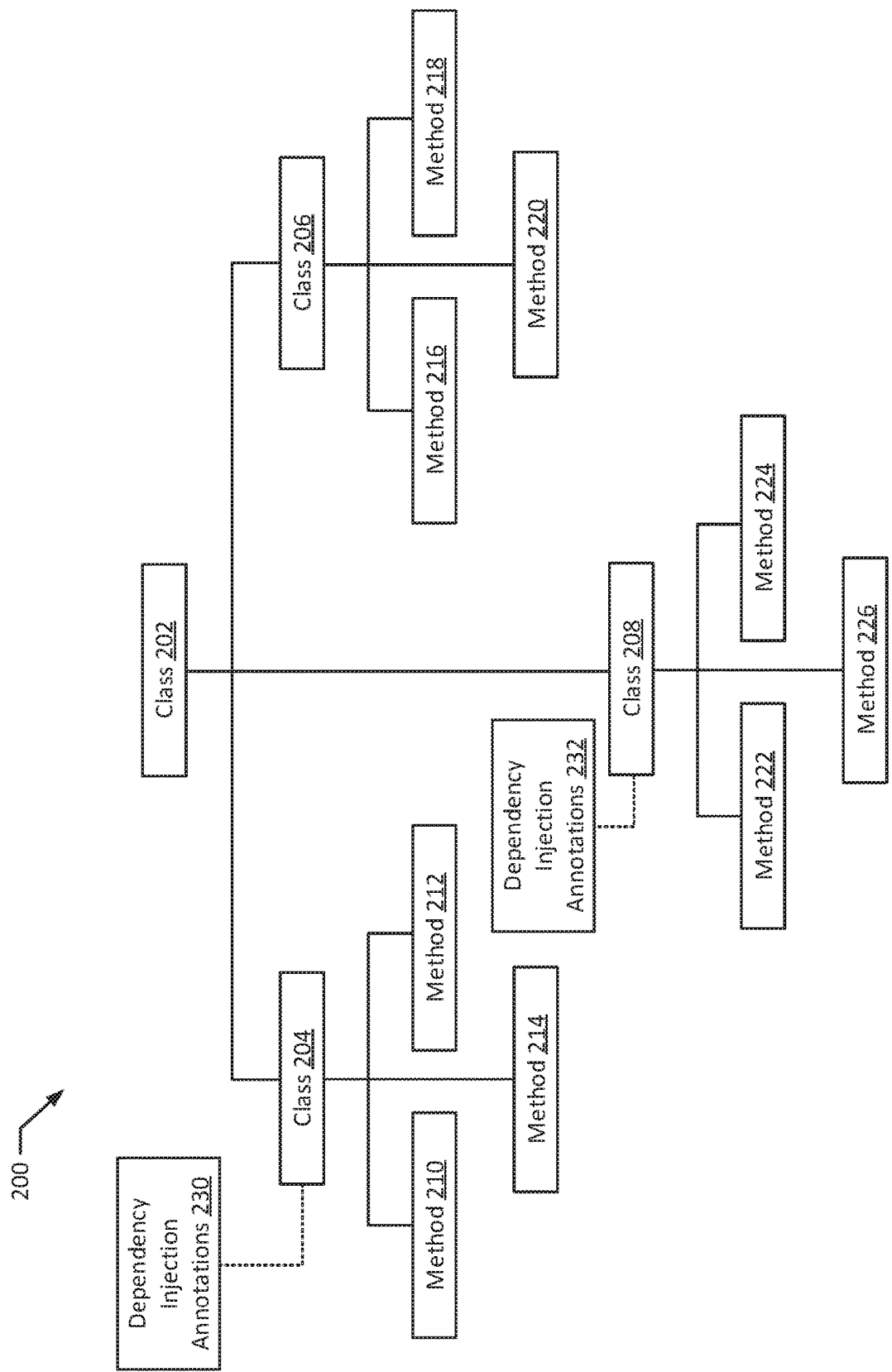
FIG. 2 illustrates a class structure for a software application according to an exemplary embodiment of the present disclosure.

FIG. 2 illustrates a class structure 200 for a software application according to an exemplary embodiment of the present disclosure. For example, the class structure 200 may represent relationships between classes for software application, such as the software application 106. In particular, the class structure 200 may depict a hierarchy of classes 202, 204, 206, 208 for a software application. The classes 202, 204, 206, 208 may be exemplary implementations of the classes 118, 120. In particular, the classes 202, 204, 206, 208 include methods 210, 212, 214, 216, 218, 220, 222, 224, 226. The methods 210, 212, 214, 216, 218, 220, 222, 224, 226 may be configured to perform one or more functions on behalf of the classes 202, 204, 206, 208. For example, the classes 204, 206, 208 may include methods 210, 212, 214, 216, 218, 220, 222, 224, 226 configured to send an email, update a database, retrieve data, manipulate data, communicate with other software applications, call other methods, and the like.

The classes 202, 204, 206, 208 may be organized according to a hierarchy or taxonomy. In such hierarchies or taxonomies, classes below other classes within the taxonomy may depend on the higher classes. As a specific example, the classes 204, 206, 208 depend from the class 202 and are located beneath the class 202 within the class structure 200. In such configurations, the class 202 may be considered a "parent" class to the classes 204, 206, 208 and the classes 204, 206, 208 may be considered "child" classes of the class 202.

Certain classes may be configurable with various dependencies that may be used to adjust how an instantiated copy of the class performs within a runtime environment. For example, classes may be configurable to enable certain functionality, such as to provide certain predefined services, communicate using specified communication protocols, or to store particular types of data. As another example, classes may be configurable to integrate with an existing computing system deployment (e.g., to communicate with particular databases, to access certain network configurations, to request or receive data from particular network addresses). In such instances, configurable aspects of the classes may be controllable at runtime as dependency information. For example, the dependency information may be received from a user or other computing service requesting execution or instantiation of the class.

In certain instances, dependency information that a class is configured to received may be specified as metadata for the class. For example, the classes 204, 208 include dependency injection annotations 230, 232, which may represent all or part of the metadata for the classes 204, 208 and may identify particular fields (e.g., IP addresses, communication protocols, and any of the examples discussed herein) that specify configurable aspects (e.g., dependency information) of the classes 204, 208. Because the classes 204, 208 are configurable and include dependency injection annotations 230, 232, the classes 204, 208 may be referred to as "dependency injection" classes. Upon receiving configuration details corresponding to the dependency injection annotations 230, 232 at runtime, the classes 204, 208 may be configured to "inject" the received information by applying or enabling particular aspects of the classes 204, 208 before generating bytecode for the classes 204, 208 to execute within a runtime environment 104.

The above details may correspond to the Java® context and dependency injection (CDI) system. In such instances, dependency injection classes may be identified as CDI bean classes. In practice, it should be understood that additional or alternative dependency injection systems may be used, such as systems compatible with C#, AngularJS, or other programming languages. In general, such classes may be known as "application framework" classes.

Figure 3:
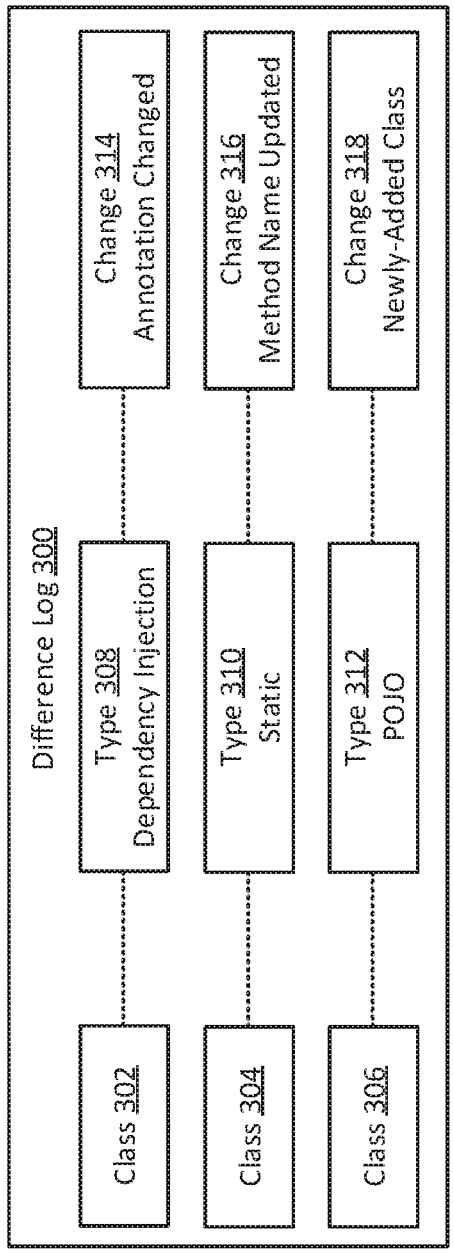
FIG. 3 illustrates a difference log for changes to a software application according to an exemplary embodiment of the present disclosure.

FIG. 3 illustrates a difference log 300 for changes to a software application according to an exemplary embodiment of the present disclosure. The difference log 300 may be used to track differences created by an update 126 to software applications 106. In particular, the difference log 300 may be generated by comparing an updated code base for a software application 106 to a current code base for the software application 106 (e.g., a currently-deployed version of the software application 106). Additionally or alternatively, the difference log 300 may be generated based on a change log or other record of stored changes created by an update 126.

The difference log 300 may represent changes to each of the one or more classes of the software application altered by a received update 126. For example, the difference log 300 may identify a specific class, a type of class, and a change to the specific class. In particular, the difference log 300 identifies changes to three classes 302, 304, 306. The class 302 has a type 308 of a dependency injection class, and the change 314 indicates that an annotation of the classes 302 was changed. The class 304 is a static class, as indicated by the type 310, and the change 316 indicates that a method name for a method within the class 306 was updated. The class 306 is a plain old Java object (POJO), as indicated by the type 312, and represents a newly-added class to the software application, as indicated by the change 318.

The difference log 300 may be generated by comparing class files and/or class structures of a runtime executable unit associated with the update to class files and/or class structures of a current version of the runtime executable unit. The difference log 300 may be stored as a text file, XML document, metadata for the update, or any other format. For example, the difference log 300 may be stored as an XML document containing entries for each of the changes 314, 316, 318, where the entries include additional information (e.g., regarding the classes 302, 304, 306, the types 308, 310, 312, and/or other information).

It should be understood that the above examples of the difference log 300 are merely exemplary. Additional or alternative implementations of difference logs may include different types of classes and/or different types of class changes. For example, difference logs may be used to monitor differences to other types of Java classes, such as concrete classes, abstract classes, final classes, inner classes, and the like. Furthermore, difference logs may be used to monitor differences to other types of classes for other objects-oriented programming languages, such as C++, Python, and the like.

In still further implementations, difference logs may be used to track changes to other types of runtime executable units for software applications 106. For example, difference logs may be used to track changes to other types of runtime executable units, such as Java persistence API (JPA) entities (e.g., JPA entities mapping classes to particular database tables using one or more proxies) and Java® Quarkus CDI beans (e.g., schema migrations for Quarkus CDI beans).

Figure 4A:
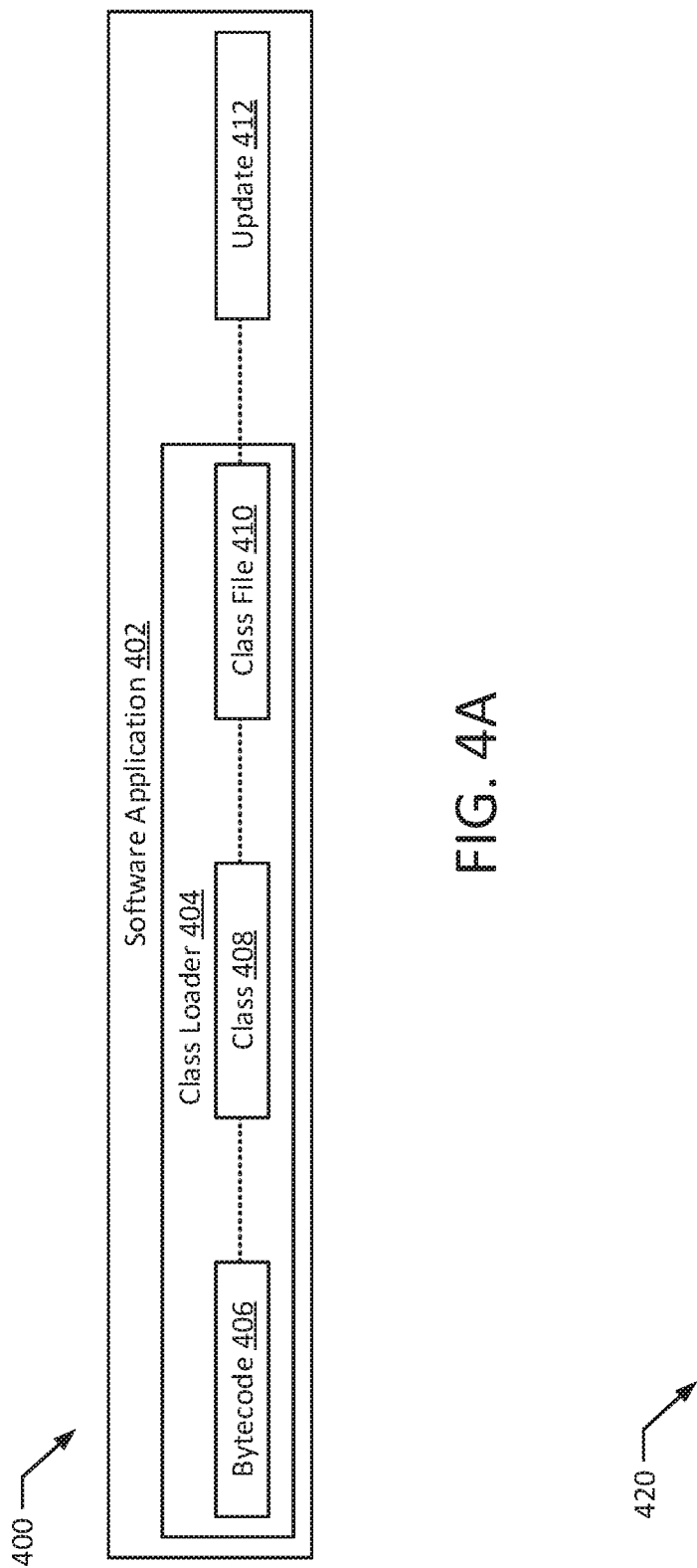
FIGS. 4A-4B illustrate updating a class loader for a software application according to an exemplary embodiment of the present disclosure.
Figure 4B:
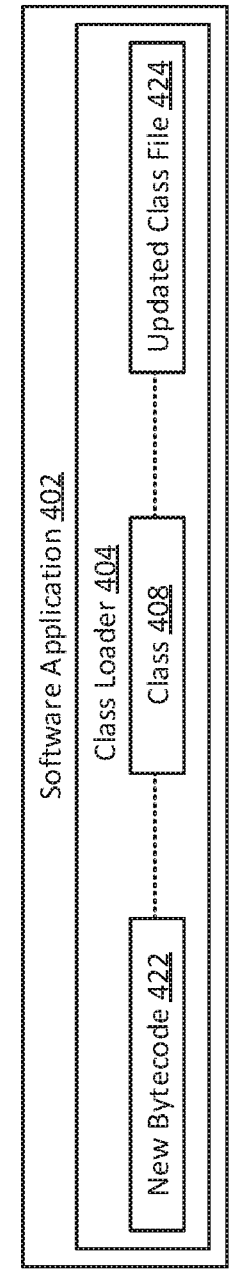

FIGS. 4A-4B illustrate updating a class loader 404 for a software application 402 according to an exemplary embodiment of the present disclosure. The software application 402 may be an exemplary implementation of the software application 106. The software application includes a class loader 404, which may be an exemplary implementation of the runtime executable unit 112. As explained further below, a class loader 404 may be updated when it is determined that classes within the class loader 404 have been changed, but that the class structure for the software application 402 has not been changed.

For example, at stage 400, the software application 402 receives an update 412 to a class file 410 for the class 408. For example, the update 412 may include one or more changes to a method of the class, changes to properties of the class, changes to certain types of metadata (e.g., metadata other than dependency injection annotations), and the like. In such instances, the addition of new classes may also be performed by updating the class loader (e.g., instead of replacing the class loader).

Updating the class loader 404 may include updating a class file 410 associated with the updated class 408. The updated class file 424 may be generated by applying changes indicated by the update 412 to the class file 410. Additionally or alternatively, the update 412 may include a copy of an updated class file 424 (e.g., received from a user), that incorporates the desired changes to the class 408. Bytecode 406 used to execute the class 408 within a runtime environment may also be updated. For example, as shown in stage 420, the new bytecode 422 may be generated for the class 408 and may replace the bytecode 406 within the class loader 404. The new bytecode 422 may be generated based on the updated class file 424 and/or based on updates indicated within the update 412. For example, the new bytecode 422 may be generated by compiling or interpolating the contents of all or part of the application class file 424 (e.g., at runtime).

Once the class loader 404 is updated, the software application 402 may continue executing with the new bytecode 422 and the updated class file 424. For example, execution of the software application 402 may be paused while updating the class loader 404 and may resume once the class loader 404 is updated. Pausing and resuming the software application 402 in this manner may enable the software application 402 to resume execution without having to perform initialization tasks, which can create latency issues. Furthermore, updating the class loader 404 may be nearly instantaneous (e.g., on the order of 10 ms or less in certain implementations), allowing for much faster updating of the software application 402, further improving latency when updating the software application 402. Such tools can also help developers test and analyze changes to applications in a development setting.

Updating the class loader 404 may be an exemplary implementation of updating framework metadata of a runtime executable unit. For example, the new bytecode 422 may represent framework metadata and may be analogous to the new bytecode 128 the class 408 may be analogous to the class 120. In additional or alternative implementations, similar procedures may be performed to update other types of framework metadata (e.g., for other types of runtime executable units) without terminating or restarting execution of corresponding software applications. For example, similar techniques may be performed to update portions of Java persistence API (JPA) entities (e.g., changes to proxy mapping between classes and databases) or Quarkus CDI dependency injection bytecode.

Furthermore, although a single class 408 is depicted for the class loader 404, in practice class loaders that are updated in this way may include many classes (e.g., tens, hundreds, or thousands of classes). Similar techniques may be performed to update each changed class, such as each class identified in a difference log for the received update 412.

Figure 5A:
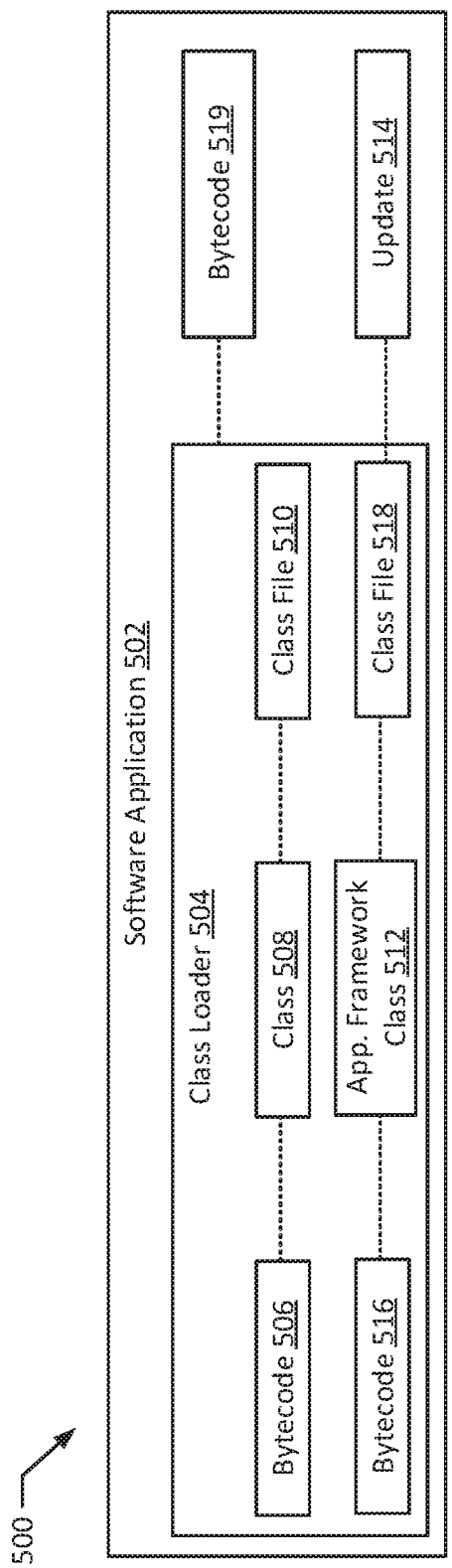
FIGS. 5A-5B illustrate replacing a class loader for a software application according to an exemplary embodiment of the present disclosure.
Figure 5B:
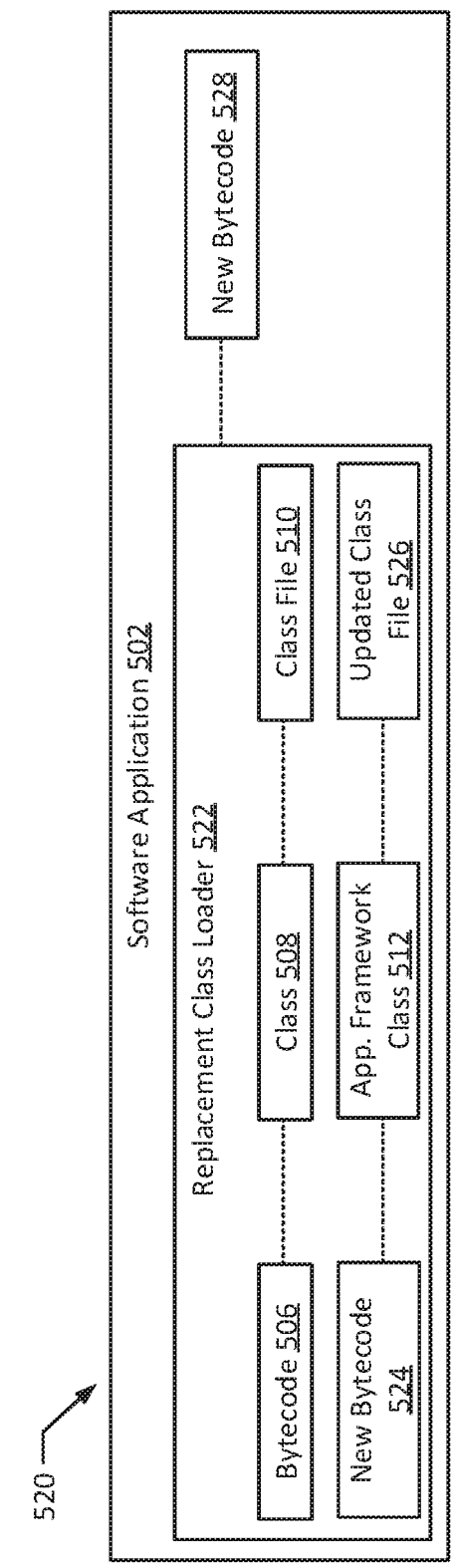

FIGS. 5A-5B illustrate replacing a class loader 504 for a software application 502 according to an exemplary embodiment of the present disclosure. The software application 502 may be an exemplary implementation of the software application 106 and the class loader 504 may be an exemplary implementation of the runtime executable unit 112. As explained further below, a class loader 504 may be replaced when it is determined that the class structure for a software application 502 has changed. For example, the class loader 504 may be replaced when it is determined, based on a difference log 300 or other difference tracking mechanism, that an update includes a change to the class structure of the software application 502.

For example the class loader 504 has two classes 508, 512. One of the classes 512 is an application framework class. At stage 500, an update 514 is received that includes changes to the class file 518 corresponding to the application framework class 512. Changes to application framework classes 512 may require the class loader 504 to be replaced. In particular, the class loader 504 may be responsible for ensuring that dependency information corresponding to application framework classes 512 is received and implemented by the application framework classes 512. In particular, the class loader 504 may include corresponding bytecode 519 executable within a runtime environment 104 to perform the services of the class loader 504. Accordingly, in addition to updating the bytecode 516 corresponding to be an application framework class 512, it may be necessary to update the bytecode 519 such that the bytecode corresponding to the class loader for the software application 502 correctly reflects the updated application framework class 512 and any available dependency information for the application framework class 512 (e.g., dependency injection annotations for the application framework class 512). In particular, one or more of changes to metadata (e.g., dependency injection annotations) for an application framework class 512, changes to methods (e.g., method inputs, method fields, method structure, method names) for an application framework class 512, changes to properties or fields for application framework class 512, creation of an application framework class 512, removal of an application framework class 512, and the like may constitute changes to a class structure for a software application 502.

When such changes are detected, the computing device 102 and/or the runtime environment 104 may be configured to pause execution of the software application 502 and replace the class loader 504 with a replacement class loader 522. Replacing the class loader 504 may include regenerating the bytecode 519 used to implement or execute the class loader 504 into new bytecode 528 to execute the replacement class loader 522. For example, the 522 may be generated based on changes to the application framework class 512 (e.g., to incorporate new or altered dependency information for the class, to account for changes in dependencies for classes).

Replacement bytecode and class files may also be generated for application framework classes 512 changed as a result of the update 514. For example, the class file 518 associated with the application framework class 512 may be replaced with an updated class file 526 and the bytecode 516 associated with the application framework class 512 may be replaced with new bytecode 524. The new bytecode 524 and the updated class file 526 may be generated using techniques similar to those discussed above in connection with FIGS. 4A-4B. In certain instances, because the class 508 was not changed, the bytecode 506 in the class file 510 associated with the class 508 may remain the same between the class loader in the replacement class loader 522.

Once the replacement class loader 522 and corresponding new bytecode 528 are generated (along with any other new bytecode 524 required for classes within the replacement class loader 522), the replacement class loader 522 may be redeployed. For example, the runtime environment may begin executing the replacement class loader 522 using the new bytecode 528. Typically, resuming execution of a software application 402 after replacing a class loader 504 may require initialization tasks for the software application 402 to be performed again. As such, once resumed, the software application 502 may begin executing the initialization tasks. Accordingly, latency for the software application 502 may be comparatively high when replacing the class loader 504 as compared to updating the class loader 404 in FIGS. 4A-5B.

Replacing the class loader 504 may be an exemplary implementation of replacing a runtime executable unit 112. For example, the new bytecode 524 may be analogous to the new bytecode 128 and the replacement class loader 522 may be analogous to the replacement class loader 130. In additional or alternative implementations, similar procedures may be performed to update portions of other types of runtime executable units without terminating or restarting execution of corresponding software applications. For example, similar techniques may be performed to update portions of JPA entities (e.g., to update the contents or bytecode for classes of JPA entities) and Quarkus CDI beans (e.g., to migrate schemas for Quarkus CDI beans).

Furthermore, although two classes 508, 512 are depicted for the class loader 504, in practice class loaders that are updated in this way may include many classes (e.g., tens, hundreds, or thousands of classes). Similar techniques may be performed to update each changed class, such as each class identified in a difference log for the received update 514.

Figure 6:
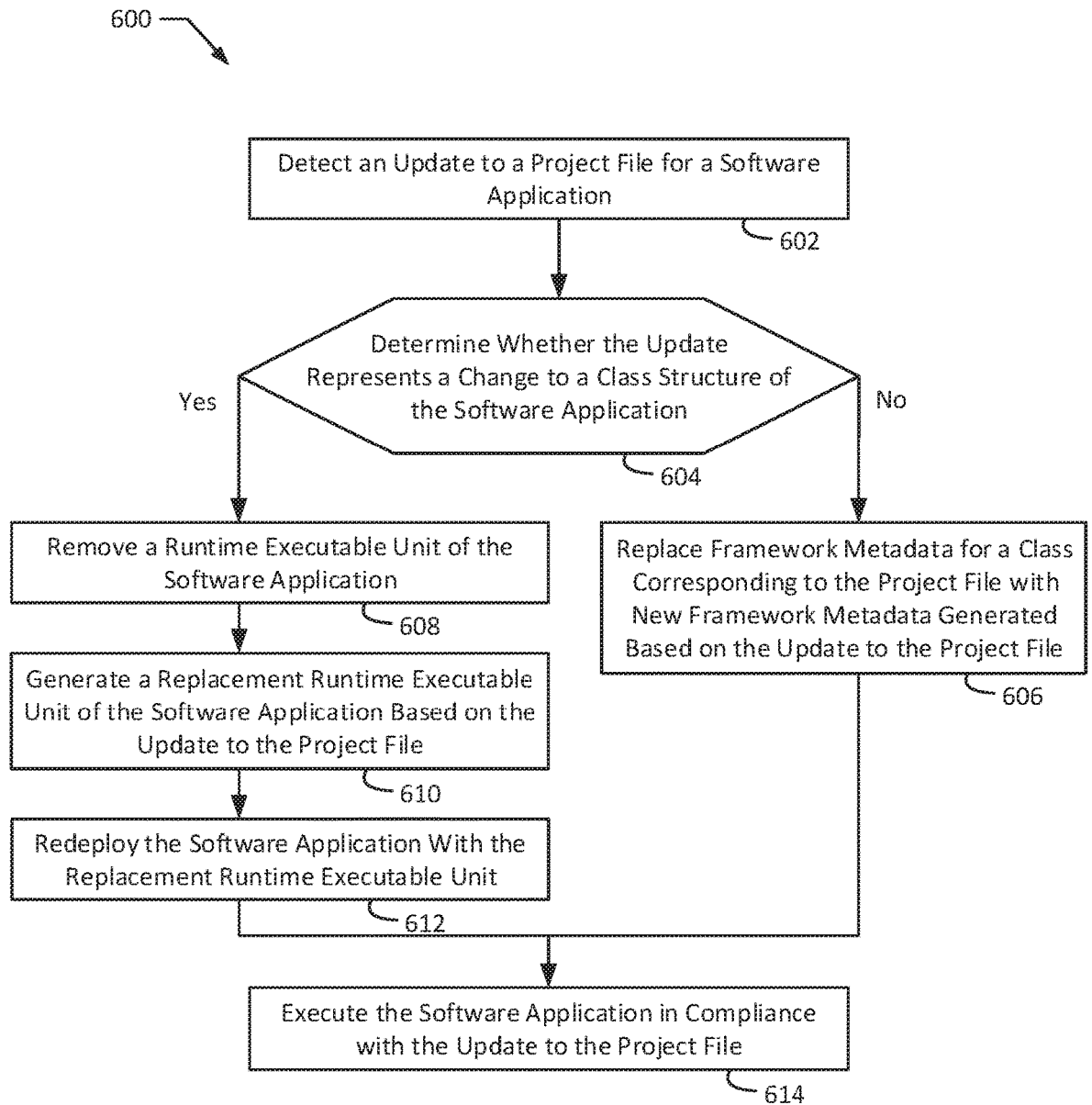
FIG. 6 illustrates a method for adaptive hot reload of a software application according to an exemplary embodiment of the present disclosure.

FIG. 6 illustrates a method 600 for adaptive hot reload of a software application according to an exemplary embodiment of the present disclosure. The method 600 may be performed by a computing device and/or a runtime environment to adaptively select between updating a runtime executable unit and replacing a runtime executable unit based on received updates for a deployed software application. The method 600 may be implemented on a computer system, such as the system 100. For example, the method 600 may be performed by one or both of the computing device 102 and the runtime environment 104. The method 600 may also be implemented by a set of instructions stored on a computer-readable medium that, when executed by a processor, cause the computer system to perform the method 600. For example, all or part of the method 600 may be implemented by the processor 132 and/or the memory 134. Although the examples below are discussed with reference to the flowchart illustrated in FIG. 6, many other methods of performing the acts associated with FIG. 6 may be used. For example, one or more of the blocks may be repeated, and some of the blocks described may be optional.

The method 600 may begin with detecting an update to a project file for a software application (block 602). For example, an update 126, 412, 514 may be detected to a project file for a software application 106, 402, 502. The update 126, 412, 514 may be received by a computing device 102 executing the software application 106, 402, 502. For example, the software application 106, 402, 502 may be executing within a runtime environment 104 of a cloud computing environment that includes the computing device 102. The update 126, 412, 514 may be provided to the cloud computing environment and received by the computing device 102 in order to update the software application 106, 402, 502. In certain instances, the update 126, 412, 514 may be received from a user (e.g., a developer of the software application 106, 402, 502) and/or may be received from another software process (e.g., a software process for maintaining and updating software applications 106, 402, 502 executing on the cloud computing platform).

It may then be determined whether the update represents a change to a class structure of the software application (block 604). For example, it may be determined whether the update 126, 412, 514 represents a change to a class structure 200 of the software application 106, 402, 502. To determine whether the update 126, 412, 514 represents a change to the class structure 200, a difference log 300 may be generated for the update 126, 412, 514. For example, the difference log 300 may be generated by comparing framework metadata (e.g., bytecode) and/or a runtime executable unit (e.g., a class loader) for the update to framework metadata and/or a runtime executable unit for a currently-deployed version of the software application 106, 402, 502. Differences identified in the comparison may then be stored in the difference log 300 (e.g., as XML data entries). The difference log 300 may then be analyzed to determine whether the update 126, 412, 514 represents a change to class structure 200. For example, the difference log may be analyzed for particular types of changes to particular classes that represent changes to class structure. In particular, one or more of changes to metadata (e.g., dependency injection annotations) for an application framework class, changes to methods (e.g., method inputs, method fields, method structure, method names) for an application framework class, changes to properties or fields for an application framework class, creation of an application framework class, removal of an application framework class, creation of a JPA entity proxy, changes to a JPA entity proxy, removal of a JPA entity proxy, and the like may constitute changes to a class structure for a software application. If any such changes are detected within the difference log 300 and/or the update 126, 412, 514, it may be determined that the update 126, 412, 514 represents a change to a class structure 200 of the software application 106, 402, 502.

If a change to a class structure is not detected, framework metadata for a class corresponding to the project file may be replaced with new framework metadata generated based on the update to the project file (block 606). For example, the project file may include a class file 124, 410 associated with a class 120, 408 that is updated by the update 126, 412 and the framework metadata may include a bytecode 116, 416 for the class 120, 408. Bytecode 116, 406 associated with the class 120, 408 may be replaced with new bytecode 128, 422 generated based on the update 126, 412 to the class file 124, 410. For example, the bytecode 116, 406 may be replaced within a runtime executable unit 112 of the software application 106, 402, such as a class loader 404. In certain instances, the runtime executable unit 112 may be updated to replace the bytecode 116, 406 using techniques similar to those discussed above in connection with FIGS. 4A-4B. In particular, the framework metadata may be replaced using an instrumentation API of the Java® Runtime Environment. For example, updating the framework metadata for the class 120, 408 may include generating new bytecode 128, 422 for the class 120, 408 and adding the new bytecode 128, 422 to the runtime executable unit 112 or class loader 404. Replacing the framework metadata for the class may additionally or alternatively include generating or updating the other metadata for the software application 106, 402, such as metadata annotations for the class 120, 408 (e.g., non-dependency injection annotations 230, 232, CDI client proxies, and the like).

If a change to a class structure is detected, a runtime executable unit of the software application may be removed (block 608). For example, a runtime executable unit 112 of the software application 106, 502, such as a class loader 504, may be removed from a runtime environment 104 of the software application 106, 502. As explained further below, the runtime executable unit 112 may be removed for replacement and redeployment of the software application 106, 502.

A replacement runtime executable unit of the software application may be generated based on the update to the project file (block 610). For example, a replacement runtime executable unit 130 of the software application 106, 502 may be generated based on the update 126, 514 to the class file 124, 518. The replacement runtime executable unit 130 may include a replacement class loader 522 and may be generated by regenerating new bytecode 528 for the replacement class loader 522 based on the updated 514. For example, the replacement class loader 522 may be generated by hot reload services of the Java® runtime environment. In particular, the replacement class loader 522 may be generated to include new bytecode 528 for the replacement class load 522, new bytecode 524 for any updated classes of the replacement class loader 522, in previous versions of bytecode 506 for classes 508 that are not updated.

The software application may be redeployed with the replacement runtime executable unit (block 612). For example, the replacement runtime executable unit 130 may be added to the runtime environment 104 and the software application 106 on the computing device 102. Once copied to the runtime environment 104, execution of the software application 106 may be restarted using the replacement runtime executable unit 130 in dissociated new bytecode 528. As explained above, restarting execution of the software application in this manner may require reperformance of initialization tasks for the software application 106, 502 (e.g., establishing network endpoints, connecting to databases, creating Web servers, hibernation verification, and the like).

After block 606 or block 612, the software application may be executed in compliance with the update to the project file (block 614). For example, the software application 106, 402, 502 may be executed by the runtime environment 104 in compliance with the update 126, 412, 514 to the project file 124, 410, 518. Once the runtime executable unit 112 has been updated and/or replaced, execution of the software application 106 may continue as normal prior to the update (subject to any initialization tasks that need to be performed again).

In this way, the method 600 may enable only the necessary portions of runtime executable units to be updated and reloaded. Accordingly, stopping the software application to replace a runtime executable unit can be avoided where not necessary. In particular, by tracking and comparing the changes made by a received update, the method 600 enables the selection of an optimal update strategy for the received update. Where possible, changes are made to the existing runtime executable unit (e.g., using an instrumentation API) to update application metadata (e.g., bytecode) without stopping execution of the software application. As a specific example for Quarkus CDI beans, hibernate validation for the entities may not have to be repeated when resuming execution of the software application, which can substantially reduce latency (e.g., on the order of a 20-50% latency reduction or more) for the software application resumes execution. Similar performance benefits may result for other applications as well (e.g., for updating Java class bytecode and/or class loaders). Thus, the method 600 captures the benefits of both methods for updating software applications in deployment.

Figure 7:
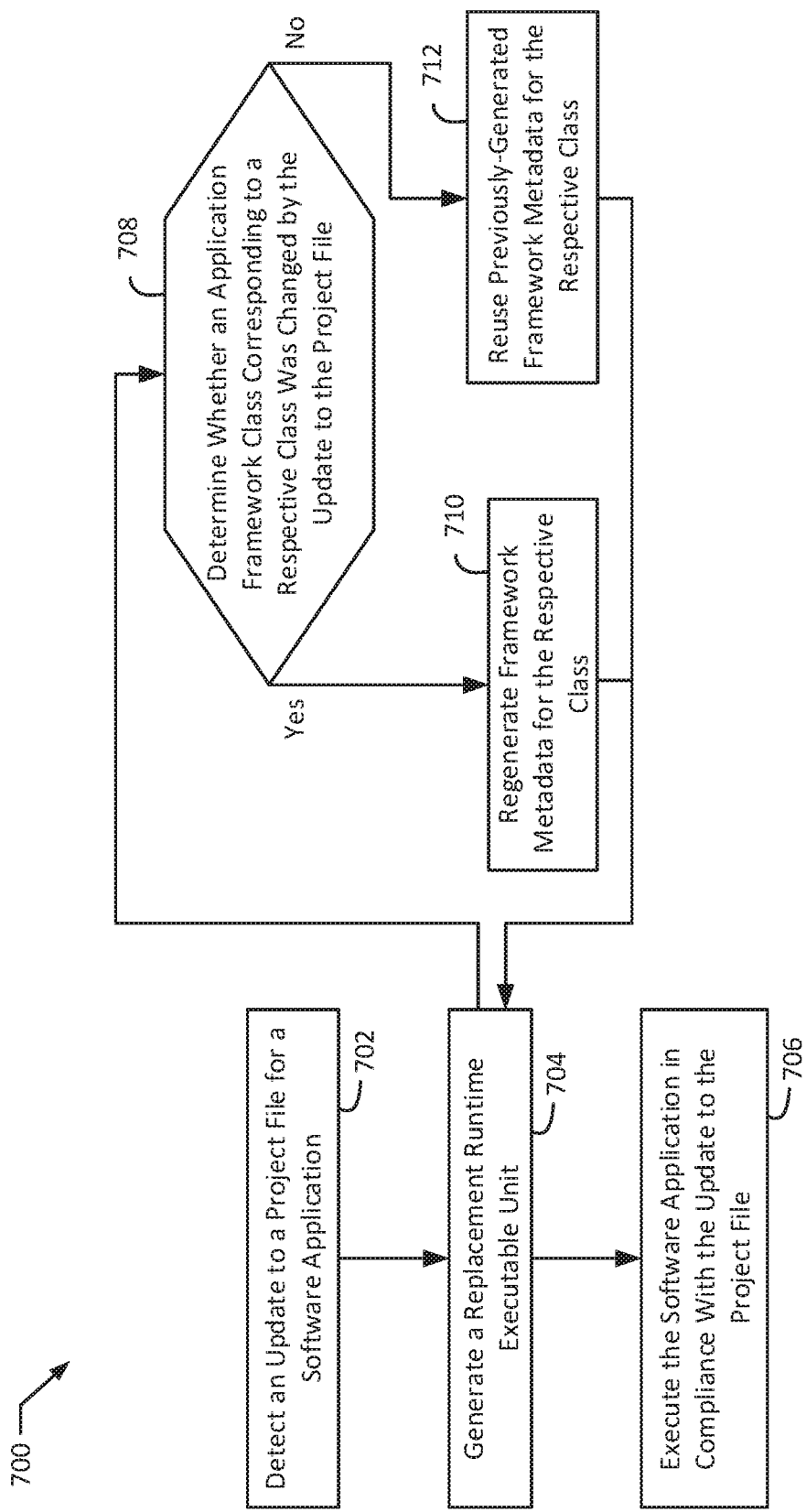
FIG. 7 illustrates a method for adaptive hot reload of a software application according to an exemplary embodiment of the present disclosure.

FIG. 7 illustrates a method 700 for adaptive hot reload of a software application according to an exemplary embodiment of the present disclosure. The method 700 may be performed by a computing device and/or a runtime environment to adaptively select between updating a class loader and replacing a class loader based on received updates for a deployed software application. The method 700 may be implemented on a computer system, such as the system 100. For example, the method 700 may be performed by one or both of the computing device 102 and the runtime environment 104. The method 700 may also be implemented by a set of instructions stored on a computer-readable medium that, when executed by a processor, cause the computer system to perform the method 700. For example, all or part of the method 700 may be implemented by the processor 132 and/or the memory 134. Although the examples below are discussed with reference to the flowchart illustrated in FIG. 7, many other methods of performing the acts associated with FIG. 7 may be used. For example, one or more of the blocks may be repeated, and some of the blocks described may be optional.

The method 700 may begin with detecting an update to a project file for a software application (block 702). For example, an update 126, 514 may be detected to a project file for a software application 106, 402, 502. The update 126, 514 may be detected at block 702 similar to the block 602, discussed above.

The replacement runtime executable unit may be generated (block 704). For example, the runtime environment 104 and/or the computing device 102 may generate a replacement runtime executable unit 130, 522 for the software application 106, 502. As explained above, replacement runtime executable units 130, 522 may be generated to minimize the amount of new bytecode that needs to be generated. For example, the replacement runtime executable unit may be generated to include new bytecode for each class and application framework class modified by the received update 126, 514 (e.g., each class identified in a difference log 300). However, it may not be necessary to update the bytecode for all other classes within the runtime executable unit. For example, to ensure proper functioning within an updated class structure, it may be necessary to update bytecode for application framework classes. However, other types of classes may not require new bytecode to function correctly.

Accordingly, it may be determined whether an application framework class corresponding to a respective class was changed as a result of the update to the project file (block 708). For example, the computing device 102 and/or the runtime environment 104 may determine whether each of the classes that was not directly modified by the update 126, 514 corresponds to an application framework class that was changed. For example, it may be determined whether the respective class includes any parent classes that are application framework classes. For example, metadata for the parent classes may be analyzed to determine whether the metadata contains application framework annotations (e.g., dependency injection annotations). If the metadata of a parent class contains application framework annotations, it may be determined that the parent class is an application framework class. For any such parent classes that are an application framework class, it may be determined whether the update 126, 514 changed the application framework class. For example, the difference log may be analyzed for changes to the parent class. If the difference log includes a change to the parent class, it may be determined that a corresponding application framework class was changed. If the difference log does not include a change to the parent class, it may be determined that a corresponding application framework class was not changed.

If the corresponding application framework class was changed, framework metadata may be regenerated for the respective class (block 710). For example, new framework metadata (e.g., updated application framework annotations, updated bytecodes) may be generated for the application framework class based on the changes to the class structure. As one specific example, if a method name or method inputs for a method in a parent case of the respective class changes, the bytecode may be generated to refer to the proper method name or method inputs.

If the corresponding application framework class was not changed, previously-generated framework metadata for the respective class may be reused (block 712). For example, when generating a replacement runtime executable unit, the computing device 102 and/or the runtime environment 104 may reuse framework metadata from the previous version of the runtime executable unit. In one specific example, bytecode 506 for a class 508 that is not an application framework class 512 may be reused from a previous version of a class loader 504 when generating a replacement class loader 522. Accordingly, the replacement class loader 522 may include the same bytecode 506 for the class 508.

Blocks 708, 710, 712 may be repeated for multiple classes of the software application 106, 502. For example, block 708, 710, 712 may be repeated for all of or a subset of the plurality of classes for the software application 106, 502 that were not directly altered by the update. This process may be repeated until framework metadata is regenerated for the application framework classes within the software application. The replacement runtime executable unit 130 may be generated by combining the regnenerated and reused framework metadata generated at blocks 708, 710, 712 with the replacement framework metadata generated for classes directly altered by the update 126, 514.

The software application may be executed in compliance with the update to the project file (block 706). For example, the software application 106, 502 may be executed in compliance with the update 126, 514 to the project file 124, 518. For example, the software application may be executed using techniques according to those discussed above in connection with the block 614.

In this way, the method 700 may reduce the overall amount of bytecode that needs to be regenerated for updates that require a replacement runtime executable unit. Accordingly, even where replacement runtime executable units are necessary, the method 700 preserves computing resources and reduces overall latency for software applications that are stopped and restarted to incorporate updates. As a specific example for Quarkus CDI beans, bytecode may not need to be generated for the Quarkus ArC system even when replacing an runtime executable unit, significantly speeding up how quickly the software application is restarted (e.g., on the order of 10-50% latency reduction, or more). Similar performance benefits may result for other applications as well (e.g., for updating Java class bytecode and/or class loaders).

Furthermore, the techniques of the method 700 may be combined with those of the method 600. For example, one or more of the blocks 706, 708, 710, 712 may be performed to implement all or part of generating the replacement runtime executable unit at block 610. In such implementations, the selective regeneration of the runtime executable unit enabled by the method 680 combined with the method 700's minimization of the bytecode that needs to be regenerated to further reduce the overall time and computing resources required to update deployed software applications, improving latency and computing resource availability.

Figure 8:
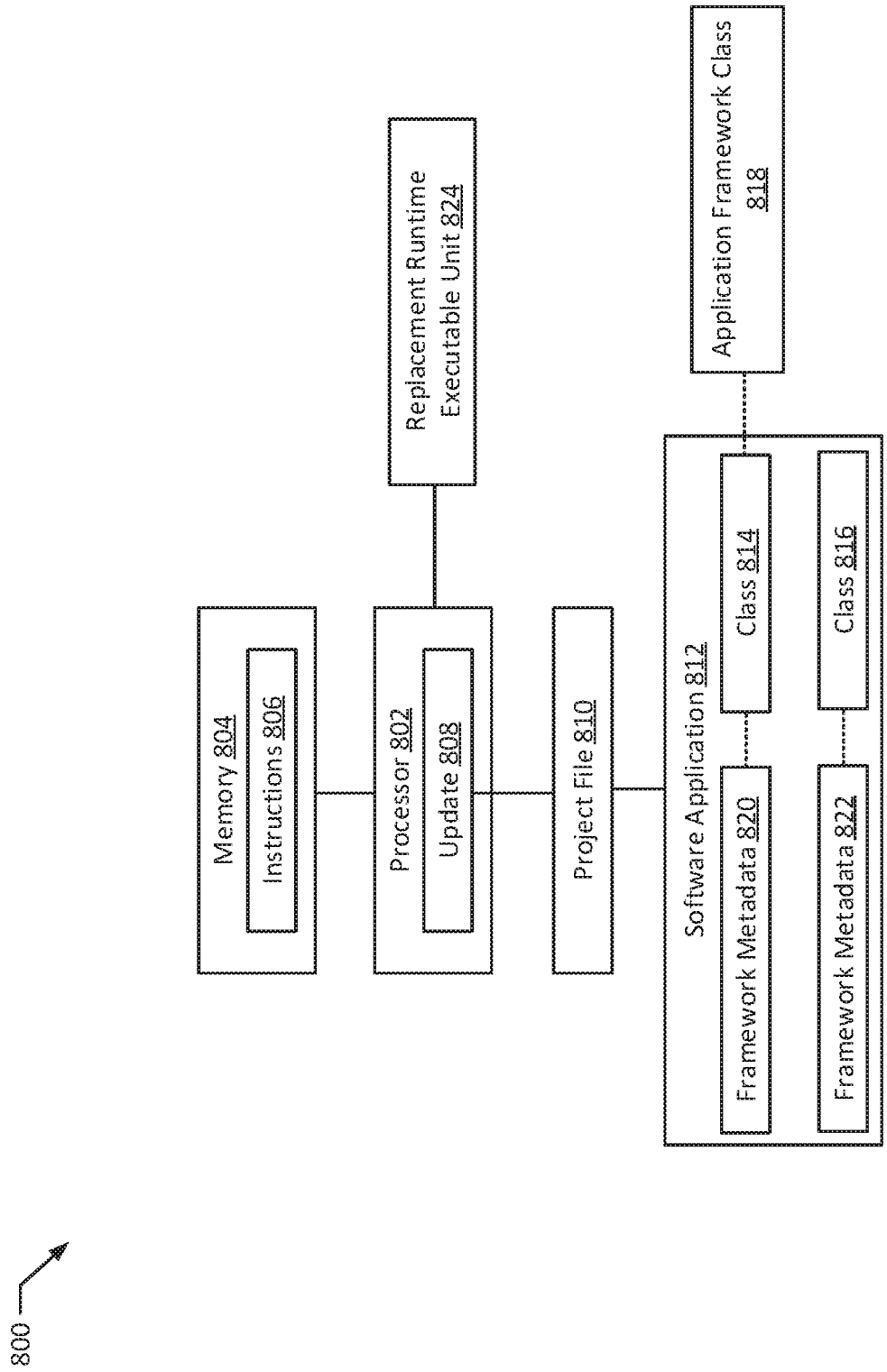
FIG. 8 illustrates a system according to an exemplary embodiment of the present disclosure.

FIG. 8 illustrates a system 800 according to an exemplary embodiment of the present disclosure. The system 800 includes a processor 802 and a memory 804. The memory 804 stores instructions 806 which, when executed by the processor 802, cause the processor 802 to detect an update 808 to a project file 810 for a software application 812. The instructions 806 may also cause the processor to generate a replacement runtime executable unit 824 of the software application 812 by, for each respective class 814, 816 of a plurality of classes 814, 816 of the software application, determining whether the respective class 814, 816 is an application framework class 818. If the respective class 814 is an application framework class 818, framework metadata 820 for the respective class 814 may be regenerated. If the respective class 816 is not an application framework class 818, framework metadata 822 for the respective class 816 may be reused. The software application 812 may then be executed in compliance with the update 808 to the project file 810.

Aspects of the subject matter described herein may be useful alone or in combination with one or more aspects described herein. In a first aspect, a method is provided that includes detecting an update to a project file for a software application and determining whether the update represents a change to a class structure of the software application. Responsive to determining that the update does not represent a change to the class structure, the method may include replacing framework metadata for a class corresponding to the project file with new framework metadata generated based on the update to the project file. Responsive to determining that the update represents a change to the class structure, the method may include removing a runtime executable unit of the software application, generating a replacement runtime executable unit of the software application based at least in part on the update to the project file, and redeploying the software application with the replacement runtime executable unit. The method may further include executing the software application in compliance with the update to the project file.

In a second aspect according to any of the previous aspects (e.g., the first aspect), the runtime executable unit includes a class loader and generating the replacement runtime executable unit includes generating a replacement class loader for the software application.

In a third aspect according to any of the previous aspects (e.g., the second aspect), generating the replacement class loader comprises selectively generating replacement bytecode for dependency injection classes within the software project.

In a fourth aspect according to any of the previous aspects (e.g., the second aspect), generating the replacement class loader comprises, for each respective class of a plurality of classes of the software application determining whether an application framework class corresponding to the respective class was changed as a result of the update to the project file, responsive to determining that the application framework class corresponding to the respective class was changed, regenerating a bytecode for the respective class, and responsive to determining that the application framework class corresponding to the respective class was not changed, reusing framework metadata for the respective class.

In a fifth aspect according to any of the previous aspects (e.g., the fourth aspect), the framework metadata includes a previously-generated bytecode for the respective class.

In a sixth aspect according to any of the previous aspects (e.g., the fifth aspect), the previously-generated bytecode includes a context and dependency injection (CDI) client proxy.

In a seventh aspect according to any of the previous aspects (e.g., the fourth aspect), the software application is a Java software application and the application framework class is identified by context and dependency injection (CDI) annotations.

In an eighth aspect according to any of the previous aspects (e.g., the seventh aspect), the CDI annotations identify the application framework class as a CDI bean class within the software application.

In a ninth aspect according to any of the previous aspects (e.g., the fourth aspect), the method further comprises, before reusing the previously-generated bytecode, determining that a configuration has not changed as a result of the update to the project file. The configuration may be associated with at least one of (i) the application framework class and (ii) the respective class.

In a tenth aspect according to any of the previous aspects (e.g., the first aspect), the method further comprises generating a difference log identifying (i) one or more classes changed by the update, (ii) types for the one or more classes changed by the update, and (iii) changes made to the one or more classes by the update.

In an eleventh aspect according to any of the previous aspects (e.g., the tenth aspect), determining whether the update represents a change to the class structure further comprises identifying, within the difference log, a change identifying one or more of: adding a new class to the class structure, changing annotation metadata for a class within the class structure, changing a field of a method within the class structure, and changing a name of a method within the class structure.

In a twelfth aspect according to any of the previous aspects (e.g., the first aspect), the software application is a Java software application and the runtime executable unit and the replacement runtime executable unit are both Java class loaders.

In a thirteenth aspect according to any of the previous aspects (e.g., the twelfth aspect), the new framework metadata is generated by a Java instrumentation API.

In a fourteenth aspect according to any of the previous aspects (e.g., the first aspect), the update to the project file includes a change to a class file of the software application.

In a fifteenth aspect, a system is provided that includes a processor and a memory. The memory may store instructions which, when executed by the processor, cause the processor to detect an update to a project file for a software application and determine whether the update represents a change to a class structure of the software application. Responsive to determining that the update does not represent a change to the class structure, the instructions may cause the processor to replace framework metadata for a class corresponding to the project file with new framework metadata generated based on the update to the project file. Responsive to determining that the update represents a change to the class structure, the instructions may cause the processor to remove an runtime executable unit of the software application, generate a replacement runtime executable unit of the software application based at least in part on the update to the project file, and redeploy the software application with the replacement runtime executable unit. The instructions may further cause the processor to execute the software application in compliance with the update to the project file.

In a sixteenth aspect according to any of the previous aspects (e.g., the fifteenth aspect), generating the replacement runtime executable unit comprises selectively generating replacement framework metadata for dependency injection classes within the software project.

In a seventeenth aspect according to any of the previous aspects (e.g., the sixteenth aspect), generating the replacement runtime executable unit comprises, for each respective class of a plurality of classes of the software application determining whether an application framework class corresponding to the respective class was changed as a result of the update to the project file. Responsive to determining that the application framework class corresponding to the respective class was changed, the instructions may cause the processor to regenerate framework metadata for the respective class. Responsive to determining that the application framework class corresponding to the respective class was not changed, the instructions may cause the processor to reuse a previously-generated framework metadata for the respective class.

In an eighteenth aspect according to any of the previous aspects (e.g., the seventeenth aspect), the software application is a Java software application and the application framework class is identified by context and dependency injection (CDI) annotations.

In a nineteenth aspect according to any of the previous aspects (e.g., the eighteenth aspect), the CDI annotations identify the application framework class as a CDI bean class within the software application.

In a twentieth aspect according to any of the previous aspects (e.g., the seventeenth aspect), the instructions further cause the processor to, before reusing the previously-generated framework metadata, determine that a configuration has not changed as a result of the update to the project file. The configuration may be associated with at least one of (i) the application framework class and (ii) the respective class.

In a twenty-first aspect according to any of the previous aspects (e.g., the fifteenth aspect), the instructions further cause the processor to generate a difference log identifying (i) one or more classes changed by the update, (ii) types for the one or more classes changed by the update, and (iii) changes made to the one or more classes by the update.

In a twenty-second aspect according to any of the previous aspects (e.g., the twenty-first aspect), determining whether the update represents a change to the class structure further comprises identifying, within the difference log a change identifying one or more of: adding a new class to the class structure, changing annotation metadata for a class within the class structure, changing a field of a system within the class structure, and changing a name of a system within the class structure.

In a twenty-third aspect according to any of the previous aspects (e.g., the fifteenth aspect), the software application is a Java software application and the runtime executable unit and the replacement runtime executable unit are both Java class loaders.

In a twenty-fourth aspect according to any of the previous aspects (e.g., the twenty-third aspect), the new framework metadata is generated by a Java instrumentation API.

In a twenty-fifth aspect according to any of the previous aspects (e.g., the fifteenth aspect), the update to the project file includes a change to a class file of the software application.

In a twenty-sixth aspect, a non-transitory, computer-readable medium is provided storing instructions which, when executed by a processor, cause the processor to detect an update to a project file for a software application and determine whether the update represents a change to a class structure of the software application. Responsive to determining that the update does not represent a change to the class structure, the instructions may cause the processor to replace framework metadata for a class corresponding to the project file with new framework metadata generated based on the update to the project file. Responsive to determining that the update represents a change to the class structure, the instructions may cause the processor to remove an runtime executable unit of the software application, generate a replacement runtime executable unit of the software application based at least in part on the update to the project file, and redeploy the software application with the replacement runtime executable unit. The instructions may further cause the processor to execute the software application in compliance with the update to the project file.

In a twenty-seventh aspect, a system is provided comprising detecting means for detecting an update to a project file for a software application and determining means for determining whether the update represents a change to a class structure of the software application. The system may also include framework metadata replacement means for, responsive to determining that the update does not represent a change to the class structure, replacing framework metadata for a class corresponding to the project file with new framework metadata generated based on the update to the project file. The system may further include runtime executable unit replacement means for, responsive to determining that the update represents a change to the class structure removing an runtime executable unit of the software application, generating a replacement runtime executable unit of the software application based at least in part on the update to the project file, and redeploying the software application with the replacement runtime executable unit. The system may also include executing means for executing the software application in compliance with the update to the project file.

In a twenty-eighth aspect, a method is provided that includes detecting an update to a project file for a software application and generating a replacement runtime executable unit of the software application by, for each respective class of a plurality of classes of the software application. The method may also include determining whether an application framework class corresponding to the respective class was changed as a result of the update to the project file. Responsive to determining that the application framework class corresponding to the respective class was changed, framework metadata for the respective class may be regenerated. Responsive to determining that the application framework class corresponding to the respective class was not changed by the update, the method may include reusing framework metadata for the respective class. The method may further include executing the software application in compliance with the update to the project file.

In a twenty-ninth aspect according to any of the previous aspects (e.g., the twenty-eighth aspect), the software application is a Java software application and the application framework class is identified by context and dependency injection (CDI) annotations.

In a thirtieth aspect according to any of the previous aspects (e.g., the twenty-ninth aspect), the CDI annotations identify the application framework class as a CDI bean class within the software application.

In a thirty-first aspect according to any of the previous aspects (e.g., the twenty-eighth aspect), the method further comprises, before reusing the previously-generated framework metadata, determining that a configuration has not changed as a result of the update to the project file. The configuration may be associated with at least one of (i) the application framework class and (ii) the respective class.

In a thirty-second aspect according to any of the previous aspects (e.g., the twenty-eighth aspect), the method further comprises, prior to generating the replacement runtime executable unit, determining whether the update represents a change to a class structure of the software application.

In a thirty-third aspect according to any of the previous aspects (e.g., the thirty-second aspect), the method further comprises, responsive to determining that the update does not represent a change to the class structure, replacing framework metadata for a class corresponding to the project file with new framework metadata generated based on the update to the project file. Responsive to determining that the update represents a change to the class structure, the method may include generating the replacement runtime executable unit.

In a thirty-fourth aspect according to any of the previous aspects (e.g., the thirty-second aspect), the method further comprises generating a difference log identifying (i) one or more classes changed by the update, (ii) types for the one or more classes changed by the update, and (iii) changes made to the one or more classes by the update.

In a thirty-fifth aspect according to any of the previous aspects (e.g., the thirty-fourth aspect), determining whether the update represents a change to the class structure further comprises identifying, within the difference log a change identifying one or more of: adding a new class to the class structure, changing annotation metadata for a class within the class structure, changing a field of a method within the class structure, and changing a name of a method within the class structure.

In a thirty-sixth aspect according to any of the previous aspects (e.g., the twenty-eighth aspect), the software application is a Java software application and the runtime executable unit and the replacement runtime executable unit are both Java class loaders.

In a thirty-seventh aspect, the update to the project file includes a change to a class file of the software application.

In a thirty-eighth aspect, a system is provided that includes a processor and a memory. The memory may store instructions which, when executed by the processor, cause the processor to detect an update to a project file for a software application and generate a replacement runtime executable unit of the software application by, for each respective class of a plurality of classes of the software application. The instructions may further cause the processor to determine whether an application framework class associated with the respective class is changed by the update to the project file. Responsive to determining that the application framework class corresponding to the respective class is changed by the update, the instructions may cause the processor to regenerate framework metadata for the respective class. Responsive to determining that the application framework class associated with the respective class is not changed by the update, the instructions may cause the processor to reuse framework metadata for the respective class. The instructions may also cause the processor to execute the software application in compliance with the update to the project file.

In a thirty-ninth aspect according to any of the previous aspects (e.g., the thirty-eighth aspect), the framework metadata includes a previously-generated framework metadata for the respective class.

In a fortieth aspect according to any of the previous aspects (e.g., the thirty-ninth aspect), the previously-generated framework metadata includes a context and dependency injection (CDI) client proxy.

In a forty-first aspect according to any of the previous aspects (e.g., the thirty-eighth aspect), the software application is a Java software application and the application framework class is identified by context and dependency injection (CDI) annotations.

In a forty-second aspect according to any of the previous aspects (e.g., the forty-first aspect), the CDI annotations identify the application framework class as a CDI bean class within the software application.

In a forty-third aspect according to any of the previous aspects (e.g., the thirty-eighth aspect), the instructions further cause the processor to, before reusing the framework metadata, determine that a configuration has not changed as a result of the update to the project file. The configuration may be associated with at least one of (i) the application framework class and (ii) the respective class.

In a forty-fourth aspect according to any of the previous aspects (e.g., the thirty-eighth aspect), the instructions further cause the processor to, prior to generating the replacement runtime executable unit, determine whether the update represents a change to a class structure of the software application.

In a forty-fifth aspect according to any of the previous aspects (e.g., the forty-fourth aspect), the instructions further cause the processor to, responsive to determining that the update does not represent a change to the class structure, replace framework metadata for a class corresponding to the project file with new framework metadata generated based on the update to the project file and, responsive to determining that the update represents a change to the class structure, generate the replacement runtime executable unit.

In a forty-sixth aspect according to any of the previous aspects (e.g., the forty-fourth aspect), the instructions further cause the processor to generate a difference log identifying (i) one or more classes changed by the update, (ii) types for the one or more classes changed by the update, and (iii) changes made to the one or more classes by the update.

In a forty-seventh aspect according to any of the previous aspects (e.g., the forty-sixth aspect), determining whether the update represents a change to the class structure further comprises identifying, within the difference log a change identifying one or more of: adding a new class to the class structure, changing annotation metadata for a class within the class structure, changing a field of a system within the class structure, and changing a name of a system within the class structure.

In a forty-eighth aspect according to any of the previous aspects (e.g., the thirty-eighth aspect), the software application is a Java software application and the runtime executable unit and the replacement runtime executable unit are both Java class loaders.

In a forty-ninth aspect according to any of the previous aspects (e.g., the thirty-eighth aspect), the update to the project file includes a change to a class file of the software application.

In a fiftieth aspect, a non-transitory, computer-readable medium is provided storing instructions which, when executed by a processor, cause the processor to detect an update to a project file for a software application, generate a replacement runtime executable unit of the software application by, for each respective class of a plurality of classes of the software application, and determine whether an application framework class corresponding to the respective class was changed as a result of the update to the project file. Responsive to determining that the application framework class corresponding to the respective class was changed, the instructions may cause the processor to regenerate framework metadata for the respective class. Responsive to determining that the application framework class corresponding to the respective class was not changed, the instructions may cause the processor to reuse a previously-generated framework metadata for the respective class. The instructions may also cause the processor to execute the software application in compliance with the update to the project file.

In a fifty-first aspect, a system is provided that includes detecting means for detecting an update to a project file for a software application. The system may also include an runtime executable unit replacement means for generating a replacement runtime executable unit of the software application by, for each respective class of a plurality of classes of the software application determining whether the respective class is an application framework class, responsive to determining that the respective class is an application framework class, regenerating framework metadata for the respective class, and responsive to determining that the respective class is not an application framework class, reusing framework metadata for the respective class. The system may also include executing means for executing the software application in compliance with the update to the project file.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a processor; and
a memory storing instructions which, when executed by the processor, cause the processor to:
detect an update to a project file for a software application;
generate a replacement runtime executable unit of the software application by, for each respective class of a plurality of classes of the software application:
determining whether an application framework class corresponding to the respective class was changed as a result of the update to the project file;
responsive to determining that the application framework class corresponding to the respective class was changed, regenerating framework metadata for the respective class; and
responsive to determining that the application framework class corresponding to the respective class was not changed, reusing framework metadata for the respective class; and
execute the software application in compliance with the update to the project file.

2. The system of claim 1, wherein the framework metadata includes a previously-generated bytecode for the respective class.

3. The system of claim 2, wherein the previously-generated bytecode includes a context and dependency injection (CDI) client proxy.

4. The system of claim 1, wherein the software application is a Java software application, wherein the application framework class is a dependency injection class, and wherein the dependency injection class is identified by context and dependency injection (CDI) annotations.

5. The system of claim 4, wherein the CDI annotations identify the application framework class as a CDI bean class within the software application.

6. The system of claim 1, wherein the instructions further cause the processor to, before reusing the framework metadata, determine that a configuration has not changed as a result of the update to the project file, and wherein the configuration is associated with at least one of (i) the application framework class and (ii) the respective class.

7. The system of claim 1, wherein the instructions further cause the processor to, prior to generating the replacement runtime executable unit, determine whether the update represents a change to a class structure of the software application.

8. The system of claim 7, wherein the instructions further cause the processor to:
responsive to determining that the update does not represent a change to the class structure, replace framework metadata for a class corresponding to the project file with new framework metadata generated based on the update to the project file; and
responsive to determining that the update represents a change to the class structure, generate the replacement runtime executable unit.

9. The system of claim 7, wherein the instructions further cause the processor to generate a difference log identifying one or more classes changed by the update, types for the one or more classes changed by the update, and changes made to the one or more classes by the update.

10. The system of claim 9, wherein determining whether the update represents a change to the class structure further comprises identifying, within the difference log a change identifying one or more of: adding a new class to the class structure, changing annotation metadata for a class within the class structure, changing a field of a system within the class structure, and changing a name of a system within the class structure.

11. The system of claim 1, wherein the software application is a Java software application and the runtime executable unit and the replacement runtime executable unit are both Java class loaders.

12. A non-transitory, computer-readable medium storing instructions which, when executed by a processor, cause the processor to:
detect an update to a project file for a software application;
generate a replacement runtime executable unit of the software application by, for each respective class of a plurality of classes of the software application:
determine whether an application framework class corresponding to the respective class was changed as a result of the update to the project file;
responsive to determining that the application framework class corresponding to the respective class was changed, regenerate framework metadata for the respective class; and
responsive to determining that the application framework class corresponding to the respective class was not changed, reuse framework metadata for the respective class; and
execute the software application in compliance with the update to the project file.

13. The non-transitory, computer-readable medium of claim 12, wherein the framework metadata includes a previously-generated bytecode for the respective class.

14. The non-transitory, computer-readable medium of claim 13, wherein the previously-generated bytecode includes a context and dependency injection (CDI) client proxy.

15. The non-transitory, computer-readable medium of claim 12, wherein the software application is a Java software application, wherein the application framework class is a dependency injection class, and wherein the dependency injection class is identified by context and dependency injection (CDI) annotations.

16. The non-transitory, computer-readable medium of claim 12, wherein the instructions further cause the processor to, before reusing the framework metadata, determine that a configuration has not changed as a result of the update to the project file, and wherein the configuration is associated with at least one of (i) the application framework class and (ii) the respective class.

17. The non-transitory, computer-readable medium of claim 12, wherein the instructions further cause the processor to, prior to generating the replacement runtime executable unit, determine whether the update represents a change to a class structure of the software application.

18. The non-transitory, computer-readable medium of claim 17, wherein the instructions further cause the processor to:
  responsive to determining that the update does not represent a change to the class structure, replace framework metadata for a class corresponding to the project file with new framework metadata generated based on the update to the project file; and
  responsive to determining that the update represents a change to the class structure, generate the replacement runtime executable unit.

19. The non-transitory, computer-readable medium of claim 17, wherein the instructions further cause the processor to generate a difference log identifying one or more classes changed by the update, types for the one or more classes changed by the update, and changes made to the one or more classes by the update.

20. The non-transitory, computer-readable medium of claim 19, wherein determining whether the update represents a change to the class structure further comprises identifying, within the difference log a change identifying one or more of: adding a new class to the class structure, changing annotation metadata for a class within the class structure, changing a field of a system within the class structure, and changing a name of a system within the class structure.

* * * * *